United States Patent [19]
van Dort et al.

[11] Patent Number: 6,048,560
[45] Date of Patent: Apr. 11, 2000

[54] PROCESS FOR THE PREPARATION OF A FLAVORING COMPONENT

[75] Inventors: Johannes Marinus van Dort, Lage Vuursche; Johannes Theodorus de Heij, Hilversum, both of Netherlands

[73] Assignee: Quest International B.V., Naarden, Netherlands

[21] Appl. No.: 08/875,380

[22] PCT Filed: Jan. 9, 1996

[86] PCT No.: PCT/EP96/00156

§ 371 Date: Sep. 11, 1997

§ 102(e) Date: Sep. 11, 1997

[87] PCT Pub. No.: WO96/22702

PCT Pub. Date: Aug. 1, 1996

[30] Foreign Application Priority Data

Jan. 25, 1995 [EP] European Pat. Off. .............. 95200169

[51] Int. Cl.[7] ................................. A23L 1/22; A23L 2/56
[52] U.S. Cl. ............................................................ 426/533
[58] Field of Search .............................................. 426/533

[56] References Cited

U.S. PATENT DOCUMENTS

| | | | |
|---|---|---|---|
| 4,810,824 | 3/1989 | Dolfini et al. ........................... | 568/491 |
| 4,855,485 | 8/1989 | Hsu ......................................... | 560/104 |
| 4,927,805 | 5/1990 | Dolfini et al. ........................... | 512/27 |

FOREIGN PATENT DOCUMENTS

| | | |
|---|---|---|
| 542 343 | 5/1993 | European Pat. Off. . |
| 245 432 | 5/1987 | Germany . |
| 242 227 | 1/1997 | Germany . |

OTHER PUBLICATIONS

Kopain et al., Khin. Drev. vol. 2, pp. 68–72, 1975.
Ljunggier, Nord. Pulp Pap. Res. J., vol. 5(1), pp. 38–43, 1990.
Patent Abstracts of Japan, vol. 005, No. 079, (C–056), May 23, 1981, & JP,A,56 026829 (Mar. 16, 1981), see abstract.
Patent Abstracts of Japan, vol. 004, No. 069 (C–011), May 22, 1980, see abstract.

*Primary Examiner*—Chhaya D. Sayala
*Attorney, Agent, or Firm*—Pillsbury Madison & Sutro LLP

[57] ABSTRACT

The invention concerns a process for the preparation of flavoring components through non-enzymatic oxidative degradation at an elevated temperature below 250° C. of p-hydroxy-styrene-type compounds of general formula (I), wherein R1 is hydrogen or a hydroxy or alkoxy group and R2 is an alkyl group or an organic functional group. Preferably R1 is hydrogen, hydroxy or methoxy and R2 is an alkyl group or an aldehyde or keto group, a carboxylic acid or ester group, or a carbinol, carbinol ester or an ether group. The oxidative degradation is conveniently carried out in an organic solvent at a temperature between 120 and 200° C. The flavoring components are suitable for incorporation into flavoring or directly into foods. They have a phenolic and sweet-aromatic flavor character.

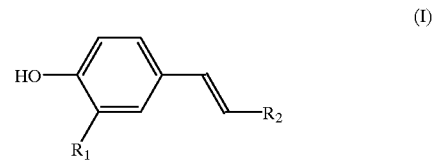

(I)

11 Claims, No Drawings

PROCESS FOR THE PREPARATION OF A FLAVORING COMPONENT

This application is the national phase of international application PCT/EP96/00156, filed Jan. 9, 1996 which was designated the U.S.

The invention concerns a process for the preparation of a flavouring component through oxidative degradation of certain substituted p-hydroxystyrene-type compounds.

The enzymatic oxidation of various p-hydroxystyrene-type compounds, leading to the corresponding benzaldehydes, is described in EP 542 348. The enzyme used in this process is lipoxydase. Thus, coniferyl alcohol, coniferyl benzoate and isoeugenol are converted into vanillin.

In U.S. Pat. Nos. 4,927,805 and 4,810,824 the hydrolytic degradation of curcumin at high temperature (>200° C.) and high pressure is described. The reaction mixture is rich in vanillin and/or guaiacol and vinylguaiacol, depending on the pH of the aqueous reaction mixture. Furthermore, the hydrolysis of curcumin, demethoxycurcumin and bisdemethoxycurcumin in a wide pH range has been studied by H. H. Tonnesen et al, Z. Lebensm. Unters. Forsch (1985) 180: 132–134 and 402–404. These compounds are the main constituents of the essential oil from the rhizomes of turmeric (Curcuma longa L).

However, there is a continuous need for novel flavouring components with rich and complex flavour notes, which nay be produced under moderate conditions and without the need for excessively high temperatures.

It has now been found that valuable flavouring components may be obtained through non-enzymatic oxidative degradation at moderate temperatures of certain substituted p-hydroxystyrene-type compounds according to the general formula given below:

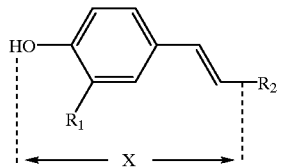

wherein R1 is hydrogen or a hydroxy or alkoxy group and R2 is an alkyl group or an organic functional group such as an aldehyde or keto group, a carboxylic acid or ester group, or a carbinol, carbinol ester or an ether group. Preferably R1 is hydrogen, hydroxy or methoxy, particularly hydrogen or methoxy.

Thus, the invention provides a process for preparing flavouring components through non-enzymatic oxidative degradation of the substituted p-hydroxystyrene-type starting materials.

The invention also provides novel flavouring components obtained by the process according to the invention.

Furthermore, the invention provides novel flavourings containing the flavouring components according to the invention.

Finally, the invention provides flavoured foodstuffs containing the flavouring components of the invention added either as such or as part of a flavouring according to the invention.

Suitable p-hydroxystyrene-type starting materials for the non-enzymatic oxidative degradation are e.g.:

curcumin, demethoxycurcumin and bisdemethoxycurcumin, wherein R2 is CO—CH$_2$—CO—X with X being the structural element indicated as such in the general formula above in which either both of R1 are methoxy, one of R1 is methoxy and the other is hydrogen, or both of R1 are hydrogen;

ferulic acid and its esters, wherein R1 is methoxy and R2 is COOH or COOR3 with R3 being derived from e.g. a lower aliphatic alcohol or a sterol;

Coupling products of ferulic acid and sugars or sugar derivatives, of which many examples may be found in vegetable products;

coniferyl alcohol or its esters, particularly its benzoate, wherein R1 is CH$_2$OH or CH$_2$OOCR, with R being an aliphatic or aromatic group.

The oxidative degradation reaction is advantageously carried out in a solvent, particularly an organic solvent, such as a lower aliphatic (i.e. C1–C4) mono- or polyhydric alcohol. Although the solvent may be separated completely from the reaction product after the degradation is completed, preferably a solvent is chosen which is undisputed from a toxicological point of view. Such a solvent is e.g. ethanol. Other solvents, particularly those generally used for flavourings, may be used as well.

The oxidative degradation reaction is carried out at elevated but moderate temperatures, preferably between 80° and 250° C., more preferably between 120° and 200° C. Particularly good results are generally obtained at temperatures above 140° C. For satisfactory conversion at least an equimolar amount of oxygen calculated on the amount of p-hydroxystyrene-type starting material is used, but preferably at least a bimolar excess of oxygen. optimal results are obtained with at least a 5-fold excess of oxygen. Pure oxygen may be used, but air is generally more convenient. To obtain the required amount of oxygen in the reaction mixture at the required temperature the reaction is conveniently carried out under pressure. Pressure vessels suitable for pressures of up to 200 bar are therefore very suitable as reaction vessels.

The reaction time is easily adaptable to the desired degree of degradation. Reaction times of between 10 minutes and 24 hours, depending on the temperature used, will generally be sufficient for satisfactory conversion. If the temperature is kept below 200° C. a reaction time of at least ½ hour is desirable.

After completion of the reaction to the desired degree of degradation the solvent may be separated from the reaction product by any suitable means, e.g. by distillation. The reaction product may thereafter be used in its entirety as a flavouring component or it may be further separated into various fractions to be used separately, e.g. by distillation, preferably distillation under reduced pressure, it may be separated in a volatile and a non-volatile fraction. Other separation techniques known in the art may be used instead.

Alternatively, if the solvent in which the degradation is carried out is suitable for human ingestion, the entire reaction mixture may be used as such, without separation of the solvent.

The flavouring components obtained according to the invention are complicated mixtures containing a variety of compounds which each give their organoleptic contribution. Thus, depending on the starting material chosen and the exact reaction conditions used for the degradation, a wide variety of organoleptic properties may be obtained which, however, all have a phenolic and sweet aromatic character in common. Unlike the flavouring components of the above cited prior art, the flavouring components directly obtained from the degradation reaction according to the invention contain relatively little vanillin, generally less than 20% w/w, and also little guaiacol or vinylguaiacol. A fraction richer in vanillin, if present at all in the degradation product, may be obtained by separating this as a volatile fraction from the non-volatile material by distillation.

The flavouring components according to the invention may be added as such to foods or they may first be combined with other flavouring components into flavourings.

The term "flavouring" is used here to mean a mixture of flavouring components of natural and/or synthetic origin, if desired dissolved in a suitable solvent or mixed with a powdered substrate, or processed into a powdered product, which is used to impart a desired flavour to foods. The term "food" is used here to mean a solid, semi-solid or liquid product intended for oral consumption by man or animals.

Flavouring components which can be advantageously combined with the components according to the invention are for example: natural products such as extracts, essential oils, absolutes, resinoids, resins, concretes etc., but also synthetic components, such as hydrocarbons, alcohols, aldehydes, ketones, ethers, acids, esters, acetals, ketals, etc., including saturated and unsaturated compounds, aliphatic, carbocyclic and heterocyclic compounds. Such flavouring components are well known in the art and are mentioned e.g. in S. Arctander, Perfume and Flavor Chemicals (Montclair, N.J., 1969), in S. Arctander, Perfume and Flavor Materials of Natural Origin, Elizabeth, N.J., U.S.A. (1960), in T. E. Furia et al., CRC Fenaroli's Handbook of Flavor Ingredients, 2nd ed., Cleveland, CRC Press Inc. (1975), in H. B. Heath, Source Book of Flavors, The Avi Publishing Co. Inc., Westport, Conn. (1981) and in "Flavor and Fragrance Materials—1991", Allured Publ. Corp. Wheaton, Ill., USA.

Solvents which can be used in flavourings which comprise the flavouring components according to the invention are, for example: ethanol, isopropanol, diethyleneglycol monoethyl ether, glycerol, triacetin etc.

The quantities of the flavouring components according to the invention used in a flavouring may be strongly divergent and depend, inter alia, on the product wherein the flavouring is to be used, on the nature and the quantity of the other components of the flavouring and on the organoleptic effect desired to be obtained by the addition of the flavouring components according to the invention. In general an amount of 0.1% by weight or more in a flavouring or 0.1 ppm by weight or more in a food will produce a useful organoleptic effect.

The following example illustrates the invention.

EXAMPLE 1

A 3 l autoclave equipped with a stirrer was charged with a suspension of 30 g curcumin in 570 ml ethanol. The autoclave was pressurized to 80 bar with air and subsequently heated to 180° C., during which the pressure further rose to 100 bar. The reaction mixture was stirred under these conditions for 2 hours and then left to cool overnight. A clear yellow solution of the flavour component in ethanol was obtained, which was ready for use without further purification. It had an agreeable rum-like flavour and odour. It was very suitable for use in liquor flavours such as whisky, rum and brandy flavours 300 ml of the solution was further concentrated by careful evaporation of the solvent. A concentrated flavour component with a strong rum-like and slightly phenolic flavour and odour was obtained which for ease of handling and dosing was conveniently dissolved in a suitable flavouring solvent. 10 g of the concentrated product was distilled under reduced pressure. The volatile fraction, weighing 1.8 g, consisted of a complex mixture containing about 0.9 g vanillin and 0.2 g p-hydroxybenzaldehyde.

The alcoholic solution was used for rounding off a vanilla flavour by addition of 0.15% w/w to a 2-fold vanilla extract, which extract was thereafter used to flavour ice cream by addition of 0.2% w/w to the ice cream.

We claim:

1. A process for the preparation of flavouring components through degradation of substituted p-hydroxy-styrene compounds wherein a p-hydroxy-styrene compound of the general formula:

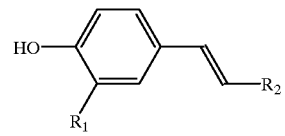

wherein $R_1$ is selected from the group consisting of hydrogen, hydroxy and alkoxy and $R_2$ is either

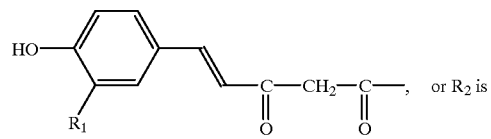

selected from the group consisting of an aldehyde group, a keto group, a carboxylic acid group, an ester group, a carbinol, a carbinol ester and an ether group, is non-enzymatically oxidatively degraded at a temperature between 80° C. and 250° C.

2. A process according to claim 1 wherein $R_1$ is selected from the group consisting of hydrogen, hydroxy and methoxy.

3. A process according to claim 1 wherein the degradation is carried out between 120 and 200° C.

4. A process according to claim 1 wherein the oxidative degradation is carried out in a solvent.

5. A process according to claim 4 in which the solvent is an organic solvent.

6. A process according to claim 1 wherein at least an equimolar amount of oxygen is used.

7. A process according to claim 6 wherein at least a bimolar excess of oxygen is used.

8. Flavouring components prepared by the process according to claim 1 in its entirety without further separation into fractions.

9. Flavourings containing flavouring components according to claim 8.

10. A food containing flavouring components according to claim 8.

11. A process according to claim 1 wherein the p-hydroxy-styrene compound is selected from the group consisting of curcumin, demethoxycurcumin and bisdemethoxycurcumin.

* * * * *